United States Patent
Honma et al.

(10) Patent No.: US 9,466,833 B2
(45) Date of Patent: Oct. 11, 2016

(54) TITANIUM RAW MATERIAL FOR LITHIUM TITANATE PRODUCTION AND METHOD FOR PRODUCING LITHIUM TITANATE USING SAME

(75) Inventors: Masatoshi Honma, Yokkaichi (JP); Kazuyoshi Takeshima, Yokkaichi (JP); Tsunehisa Takeuchi, Yokkaichi (JP); Atsushi Ishizawa, Yokkaichi (JP); Yusuke Okuda, Yokkaichi (JP)

(73) Assignee: ISHIHARA SANGYO KAISHA, LTD., Osaka (JP)

( * ) Notice: Subject to any disclaimer, the term of this patent is extended or adjusted under 35 U.S.C. 154(b) by 0 days.

(21) Appl. No.: 14/114,137

(22) PCT Filed: Apr. 26, 2012

(86) PCT No.: PCT/JP2012/061216
§ 371 (c)(1),
(2), (4) Date: Oct. 25, 2013

(87) PCT Pub. No.: WO2012/147856
PCT Pub. Date: Nov. 1, 2012

(65) Prior Publication Data
US 2014/0079625 A1   Mar. 20, 2014

(30) Foreign Application Priority Data

Apr. 28, 2011 (JP) ................. 2011-100660
Apr. 28, 2011 (JP) ................. 2011-100669

(51) Int. Cl.
| | | |
|---|---|---|
| C01D 1/02 | (2006.01) | |
| H01M 4/485 | (2010.01) | |
| C01G 23/00 | (2006.01) | |
| C01D 15/02 | (2006.01) | |
| H01M 10/052 | (2010.01) | |

(52) U.S. Cl.
CPC .............. *H01M 4/485* (2013.01); *C01D 15/02* (2013.01); *C01G 23/005* (2013.01); *H01M 10/052* (2013.01); *Y02E 60/122* (2013.01); *Y02P 70/54* (2015.11); *Y02T 10/7011* (2013.01); *Y10T 428/2982* (2015.01)

(58) Field of Classification Search
CPC .......................... C01G 23/006; C01G 23/005
USPC ............................. 423/594.15, 598
See application file for complete search history.

(56) References Cited

U.S. PATENT DOCUMENTS 6,139,815 A * 10/2000 Atsumi et al. ............ 423/598
2010/0151327 A1 * 6/2010 Nakahara et al. ........ 429/231.5

FOREIGN PATENT DOCUMENTS

| CN | 101000960 | 7/2007 |
|---|---|---|
| EP | 1 939 971 A1 | 7/2008 |
| EP | 2 200 117 A1 | 9/2009 |
| JP | 06-275263 | 9/1994 |
| JP | 2000-302547 | 10/2000 |
| JP | 2001-192208 | 7/2001 |
| JP | 2001-213622 | 8/2001 |
| JP | 2001 213623 A | 8/2001 |
| JP | 2005-504693 | 6/2002 |
| JP | 2002-289194 | 10/2002 |
| JP | 2003-146658 | 5/2003 |
| JP | 2005239461 A | 9/2005 |
| JP | 2011-063496 | 3/2011 |
| JP | 2011-111361 | 6/2011 |
| WO | WO 2008/114667 | 9/2008 |
| WO | WO 2012/029679 | 6/2010 |

OTHER PUBLICATIONS

"Nanoatlas of Selected Engineered Nanoparticles", XP055155584, Sep. 8, 2009, retrieved from internet wymiti.filparalerinanoshiprogressiDocumentstnanosh nanoatias.pdf 2014-11-27.

"Nanoatlas of Selected Engineered Nanoparticles", XP055155584, Sep. 8, 2009, retrieved from internet www.ttl.fi/partner/nanosh/progress/Documents/nanosh_nanoatlas.pdf Nov. 27, 2014.

Agung Nugroho et al. "Facile synthesis of nanosized Li4Ti5O12 in supercritical water, " Electro-chemistry Communications, Apr. 8, 2011, V. 13, Issue 6, pp. 650-653. On line Apr. 8, 2011.

* cited by examiner

*Primary Examiner* — Matthew E Hoban
*Assistant Examiner* — James Fiorito
(74) *Attorney, Agent, or Firm* — Paul E. White, Jr.; Manelli Selter PLLC (57) ABSTRACT

The invention provides a low-cost, efficient method for producing lithium titanate that is useful for applications in electric storage devices. The desired lithium titanate can be obtained by heating at least (1) titanium oxide having a BET single point specific surface area of 50 to 450 $m^2/g$ based on nitrogen adsorption and (2) a lithium compound. Preferably the titanium oxide and lithium compound are heated together with (3) a lithium titanate compound having the same crystal structure as the desired lithium titanate. Preferably these ingredients are dry-mixed before heating.

3 Claims, 1 Drawing Sheet

TITANIUM RAW MATERIAL FOR LITHIUM TITANATE PRODUCTION AND METHOD FOR PRODUCING LITHIUM TITANATE USING SAME

This application is the national phase of international application PCT/JP2012/061216 filed 26 Apr. 2012 which designated the U.S.

TECHNICAL FIELD

The present invention relates to a titanium raw material for lithium titanate production and a method for producing lithium titanate using the same. More particularly, the invention relates to a low-cost, efficient method for producing lithium titanate and a titanium raw material suitable for the method. The invention also relates to lithium titanate produced by the method, and an electrode active material and an electric storage device which include the same.

BACKGROUND ART

Lithium titanate, which has been developed as a material for an electric storage device, is used as an electrode active material excellent in safety and life property for an electric storage device, in particular, a negative electrode active material for a lithium secondary battery. The use of a lithium secondary battery as a small battery for power supply to a portable device or the like has rapidly spread. Furthermore, a large lithium secondary battery has been developed for use in power generation industries or on vehicles etc. The electrode active material for a large lithium secondary battery requires long term reliability and high input/output characteristics, and the use of lithium titanate as a negative electrode active material, in particular, is promising, due to excellence in safety and life property.

Examples of the lithium titanate include several compounds as described in Patent Literature 1. Patent literature 1 describes compounds represented by a general formula $Li_xTi_yO_4$, where $0.8 \leq x \leq 1.4$ and $1.6 \leq y \leq 2.2$, including typical examples $LiTi_2O_4$, $Li_{1.33}Ti_{1.66}O_4$, and $Li_{0.8}Ti_{2.2}O_4$. Examples of the known method for producing the lithium titanate include: a wet method (Patent Literature 2) by mixing predetermined amounts of a lithium compound and a titanium compound in solvent, drying the mixture, and firing the dried mixture; a spray drying method (Patent Literature 3) by spray-drying the mixture for drying in the wet method; a dry method (Patent Literatures 1 and 4) by dry-mixing predetermined amounts of a lithium compound and a titanium compound and firing the mixture.

CITATION LIST

Patent Literature

Patent Literature 1: JP 06-275263 A
Patent Literature 2: JP 2001-213622 A
Patent Literature 3: JP 2001-192208 A
Patent Literature 4: JP 2000-302547 A

SUMMARY OF INVENTION

Technical Problem

In both of the dry method and the wet method, a lithium compound and a titanium compound are fired to produce lithium titanate. The low reactivity due to a solid phase diffusion reaction between the respective raw materials easily allows a by-product having a different composition or the unreacted raw materials other than a target lithium titanate to remain. This prevents a battery using lithium titanate from having a sufficient electric power capacity. Meanwhile, although higher firing temperature improves the reactivity, the volatilization loss of lithium occurs easily and the contraction, sintering, and grain growth of lithium titanate particles are accelerated, resulting in reduction of the specific surface area of lithium titanate particles. This easily causes the reduction in rate characteristics of a battery using lithium titanate.

Solution to Problem

The present inventors have thought that the reaction of a titanium raw material and a lithium raw material in a mixing state as uniform as possible is important in order to improve the reactivity between the lithium compound and the titanium compound. As the result of earnest research on the method for efficiently producing a target lithium titanate, the present inventors found that the problem can be solved by using at least a titanium raw material which contains an oxide of titanium having a specific surface area in a specified range as a titanium raw material for lithium titanate production; thereby completing the present invention.

Advantageous Effects of Invention

A method for producing lithium titanate of the present invention uses a titanium raw material for lithium titanate production, which includes an oxide of titanium having a specific surface area of 50 to 450 $m^2/g$ measured by single-point BET nitrogen adsorption. This allows the titanium raw material and a lithium raw material to be easily mixed in a uniform state, improving the reactivity of the titanium raw material and the lithium raw material. As a result, a target lithium titanate can be efficiently produced.

According to the method of the present invention, a sub-phase having a different composition is less formed, less unreacted raw materials remain, sintering proceeds less rapidly, and the specific surface area is less reduced. A target lithium titanate can be reliably and stably produced at a heating temperature lower than that in a method using conventional titanium raw materials.

The use of the lithium titanate produced by the method as an electrode active material allows for production of an electric storage device excellent in battery characteristics, in particular, rate characteristics.

DESCRIPTION OF EMBODIMENTS

Measurement methods used in the present specification are described below.

Specific Surface Area

In the present specification, the specific surface area was measured by single-point BET nitrogen adsorption. Monosorb made by Yuasa-Ionics Co., Ltd. or Monosorb MS-22 made by Quantachrome Instruments was used as a measurement device.

Particle Diameter (Lithium Compound)

In the present specification, the average particle diameter of a lithium compound is the volume average particle diameter measured by a laser diffraction method. The volume average particle diameter was measured with a laser diffraction/scattering particle size distribution measurement device, using ethanol as dispersion medium. In the measurement, the refractive index of ethanol was set as 1.360, and the refractive index of a lithium compound was appropriately set corresponding to the species of the compound. For example, when the lithium compound was lithium carbonate, the refractive index was set to 1.500. As the laser diffraction/scattering particle size distribution measurement device, LA-950 made by Horiba, Ltd. was used.

Particle Diameter (Titanium Raw Material)

In the present specification, the average particle diameter of primary particles of a titanium raw material is the average value of particle diameters of 100 primary particles in an image picture of a transmission electron microscope (an electron microscope method).

In the present specification, the average secondary particle diameter of secondary particles of a titanium raw material is the volume average particle diameter measured by a laser diffraction method. The volume average particle diameter was measured with a laser diffraction/scattering particle size distribution measurement device, using pure water as dispersion medium. In the measurement, the refractive index of pure water was set as 1.333, and the refractive index of a titanium raw material was appropriately set corresponding to the species of the compound. For example, when the titanium raw material was anatase-type titanium oxide, the refractive index was set to 2.520. As the laser diffraction/scattering particle size distribution measurement device, LA-950 made by Horiba, Ltd. was used.

Particle Diameter (Precursor Mixture)

In the present specification, the average particle diameter of a lithium titanate precursor mixture is a volume average particle diameter measured by a laser diffraction method. The volume average particle diameter was measured with a laser diffraction/scattering particle size distribution measurement device, using ethanol as dispersion medium. In the measurement, the refractive index of ethanol was set as 1.360, and the refractive index of the measured particles was set to a value of the species of the lithium compound. For example, when the lithium compound was lithium carbonate, the refractive index was set to 1.567. As the laser diffraction/scattering particle size distribution measurement device, LA-950 made by Horiba, Ltd. was used.

Particle Diameter (Lithium Titanate)

In the present specification, the average particle diameter of primary particles of lithium titanate is the average value of particle diameters of 100 primary particles in an image picture of a transmission electron microscope (an electron microscope method).

In the present specification, the average secondary particle diameter of secondary particles of lithium titanate is the volume average particle diameter measured by a laser diffraction method. The volume average particle diameter was measured with a laser diffraction/scattering particle size distribution measurement device, using pure water as dispersion medium. In the measurement, the refractive index of water was set as 1.333, and the refractive index of lithium titanate was appropriately set corresponding to the species of the compound. When the lithium titanate was $Li_4Ti_5O_{12}$, the refractive index was set to 2.700. As the laser diffraction/ scattering particle size distribution measurement device, LA-950 made by Horiba, Ltd. was used in the present invention.

Bulk Density

In the present specification, the bulk density was obtained by a cylinder method (calculated from the volume and mass of a sample placed in a graduated cylinder).

Impurities

In the present specification, sodium and potassium as impurities were measured by an atomic absorption spectroscopy, $SO_4$ and chlorine were measured by an ion chromatography or with a fluorescent X-ray analyzer, and other elements such as silicon, calcium, iron, chromium, nickel, manganese, copper, zinc, aluminum, magnesium, niobium, and zirconium were measured by ICP method. $SO_4$ was measured with a fluorescent X-ray analyzer (RIGAKU RIX-2200).

The present invention is described in the following.

The present invention relates to a titanium raw material for lithium titanate production, which includes an oxide of titanium having a specific surface area of 50 to 450 $m^2/g$.

The titanium raw material for lithium titanate production (hereinafter, may be simply referred to as "titanium raw material") is a raw material which is mixed with at least a lithium compound, so that the mixture is heated to produce lithium titanate.

The titanium raw material includes an oxide of titanium. Examples of the oxide of titanium include a titanate compound (also referred to as hydrous titanium oxide) such as metatitanic acid represented by $TiO(OH)_2$ or $TiO_2 \cdot H_2O$ and orthotitanic acid represented by $Ti(OH)_4$ or $TiO_2 \cdot 2H_2O$, titanium oxide (crystalline titanium oxide such as rutile-type, anatase-type, brookite-type, and bronze-type titanium oxide, or amorphous titanium oxide), and a mixture thereof. The titanium oxide may be a type of titanium oxide having diffraction peaks from a single crystal structure in the X-ray diffraction pattern or a type of titanium oxide having diffraction peaks from a plurality of crystal structures such as the diffraction peaks from anatase and the diffraction peaks from rutile. In particular, crystalline titanium oxides are preferable.

The titanium raw material may include a substance other than the oxides of titanium. For example, the titanium raw material may include an inorganic titanium compound and an organic titanium compound such as titanium alkoxide. However, the content of the oxide of titanium in the titanium raw material is preferably 50 mol % or more, more preferably 70% or more, furthermore preferably 90% or more.

It is important that the oxide of titanium included in the titanium raw material for use in the present invention has a specific surface area in the range of 50 to 450 $m^2/g$.

The use of the titanium raw material including the oxide of titanium having a specific surface area in the range described above allows the titanium raw material and a lithium compound to be easily mixed in a uniform state, accelerating the reaction between the titanium raw material and the lithium compound in subsequent heating. As a result, a target lithium titanate can be efficiently produced. This means that a sub-phase having a different composition is less formed, less unreacted raw materials remain, sintering proceeds less rapidly, and the specific surface area is less reduced. A target lithium titanate can be reliably and stably produced at a heating temperature lower than that in a conventional method.

The oxide of titanium having a specific surface area smaller than 50 $m^2/g$ easily causes non-uniform mixture with a lithium compound and allows for insufficient reactivity, which is not preferable. The oxide of titanium having a specific surface area larger than 450 m²/g hardly produces further effect. The specific surface area is preferably in the range of 50 to 300 m²/g, more preferably in the range of 60 to 300 m²/g, and furthermore preferably in the range of 60 to 100 m²/g.

The oxide of titanium having a specific surface area in the range described above can be produced through adjustment of the specific surface area by appropriately setting the reaction temperature and reaction time in producing an oxide of titanium such as a titanate compound (hydrous titanium oxide) and titanium oxide by hydrolyzing or neutralizing a titanium compound such as titanium sulfate, titanyl sulfate, titanium chloride, titanyl chloride, and titanium alkoxide. The titanate compound (hydrous titanium oxide) or titanium oxide thus obtained may be fired at a temperature of 200 to 700° C. for adjusting the specific surface area or improving crystallinity.

The oxide of titanium included in a titanium raw material is preferably composed of fine particles, resulting in high reactivity with a lithium compound. The average primary particle diameter (an electron microscope method) is preferably in the range of 0.001 μm to 0.3 μm, more preferably 0.005 to 0.3 μm, further preferably 0.01 to 0.3 μm, and furthermore preferably 0.04 to 0.28 μm. In the case of using secondary particles granulated of the oxide of titanium, the average secondary particle diameter (a laser diffraction method) is preferably 0.05 to 5 μm, more preferably 0.1 to 3.0 μm, and further preferably 0.5 to 2.0 μm.

The oxide of titanium included in a titanium raw material preferably has a high purity, usually 90% or more by weight, more preferably 99% or more by weight. The content of Cl or $SO_4$ as impurity is preferably 1.0% or less by weight, more preferably 0.5% or less by weight. The content of each of other elements is preferably in the following specific range: silicon (1000 ppm or less), calcium (1000 ppm or less), iron (1000 ppm or less), niobium (0.3% or less by weight), and zirconium (0.2% or less by weight).

Furthermore, the oxide of titanium included in a titanium raw material preferably has a low bulk density. Specifically the oxide of titanium having a bulk density in the range of 0.2 to 0.7 g/cm³ is preferably used, allowing the titanium raw material and a lithium compound to be easily mixed in a uniform state, and accelerating the reaction between the titanium raw material and the lithium compound in subsequent heating. The range of bulk density is more preferably 0.2 to 0.6 g/cm³, and further preferably 0.2 to 0.5 g/cm³.

The present invention also relates to a method for producing lithium titanate, which includes heating at least the following two compounds: the aforementioned (1) titanium raw material for lithium titanate production; and (2) a lithium compound.

The aforementioned oxide of titanium can be used as the (1) titanium raw material for lithium titanate production. A hydroxide, a salt, an oxide of lithium, and the like may be used as the (2) lithium compound, without a specific limitation. Examples may include lithium hydroxide, lithium carbonate, lithium nitrate, lithium sulfate, and lithium oxide. These may be singly used or in combination of two or more. Among the lithium compounds, lithium hydroxide, lithium carbonate, or lithium oxide is preferably used, lithium hydroxide or lithium carbonate is more preferably used, and lithium carbonate is further preferably used, in order to prevent an acid radical from remaining in lithium titanate. In the present invention, the acid radical means a sulfate radical ($SO_4$) and a chlorine radical (Cl).

The lithium compound preferably has a high purity, usually 98.0% or more by weight. In the case of using lithium carbonate as the lithium compound, the content of $Li_2CO_3$ is preferably 98.0% or more by weight, more preferably 99.0% or more by weight, the content of impurity metal elements such as Na, Ca, K, and Mg is 1000 ppm or less, preferably 500 ppm or less, and the content of Cl and $SO_4$ is 1000 ppm or less, preferably 500 ppm or less. Preferably water is sufficiently removed. The content of water is preferably 0.3% or less by weight.

The volume average particle diameter of the lithium compound is not specifically limited. A commonly available lithium compound may be used. In the case of lithium carbonate, the volume average particle diameter is generally in the range of 10 to 100 μm.

Grain refinement of the lithium compound may be separately carried out in advance. In the grain refinement, the volume average particle diameter is reduced to preferably 5 μm or less, more preferably 4 μm or less, so as to improve the reactivity between a titanium raw material and the lithium compound. A known method may be used in the grain refinement. In particular, the volume average particle diameter of the lithium compound may be reduced by crushing to preferably 5 μm or less, more preferably 0.5 to 5 μm, further preferably 1 to 5 μm. Alternatively the volume average particle diameter may be reduced by crushing to 4 μm or less, preferably in the rage of 0.5 to 4 μm, more preferably in the range of 1 to 4 μm.

A known crusher can be used in the grain refinement. Examples of the crusher include a flake crusher, a hammer mill, a pin mill, a bantam mill, a jet mill, a cyclone mill, a Fret mill, a pan mill, an edge runner, a roller mill, a Mix-Muller, and a vibration mill. In the grain refinement, preferably crushing is performed such that the amount of coarse particles is reduced. Specifically, in the particle size distribution measured by the method explained above, the suitable D 90 (diameter at a cumulative frequency of 90%) is 10 μm or less, preferably 9 μm or less, and further preferably 7 μm or less.

The higher the specific surface area of the lithium compound is, the more preferably the reactivity between the titanium raw material and the lithium compound is improved. In the case of lithium carbonate, the specific surface area is preferably 0.8 m²/g or more, more preferably 1.0 to 3.0 m²/g.

The compounding ratio of the lithium compound to the titanium raw material may be set in accordance with the target composition of lithium titanate. In the case of producing $Li_4Ti_5O_{12}$ as lithium titanate, compounding is performed to have a Li/Ti ratio of 0.79 to 0.85.

Alternatively, the present invention may relate to a method for producing lithium titanate, which includes heating at least the following three compounds: the aforementioned (1) titanium raw material for lithium titanate production; the (2) lithium compound; and (3) a lithium titanate compound having the same crystal structure as that of a target lithium titanate.

(3) Lithium Titanate Compound Having the Same Crystal Structure as that of a Target Lithium Titanate The lithium titanate compound is used if needed. It is believed that the lithium titanate compound suppresses the sintering of the produced lithium titanate, or acts as a seed crystal. The use of the lithium titanium compound allows the heating process to be hereinafter described to be performed at a relatively low temperature and the grain growth of lithium titanate in the heating process to be properly controlled, so that the target lithium titanate can be easily produced. Having the same crystal structure as that of the target lithium titanate is thus required. The particle diameter (an electron microscope method) of the lithium titanate compound is not specifically limited. The lithium titanate may have a particle diameter comparable to the particle diameter (an electron microscope method) of the target lithium titanate, for example, in the range of 0.5 to 2.0 μm. The lithium titanate compound can be manufactured by the method of the present invention. The compounding amount is preferably 1 to 30 weight parts calculated in terms of Ti, more preferably 5 to 20 weight parts, relative to 100 weight parts of the titanium raw material. A mixing aid or the like may be used in addition to the (1), the (2), and the (3).

In the present invention, at least the (1) titanium raw material for lithium titanate production and the (2) lithium compound are heated together with the (3) lithium titanate compound having the same crystal structure as that of the target lithium titanate and the like on an as required basis as described above so as to produce lithium titanate.

The ratio of the volume average particle diameter (B μm) of the lithium compound to the volume average particle diameter (A μm) of secondary particles of the titanium raw material (B/A) is preferably 0.1 to 80, more preferably 0.1 to 20, further preferably 0.1 to 8. The B/A in the range allows the particle diameters of the lithium compound and the titanium raw material to be relatively uniformed, easily producing a mixture having a narrow particle size distribution. This further enhances the reactivity between the lithium compound and the titanium raw material. The B/A is more preferably in the range of 1.0 to 5.0, further preferably 1.0 to 4.0.

Preferably, prior to the heating, the aforementioned raw materials are mixed to prepare a mixture (hereinafter may be referred to as "precursor mixture") in advance. Preferably, the mixing includes dry-mixing at least the (1) titanium raw material for lithium titanate production and the (2) lithium compound. In the case of using the (3) lithium titanate compound having the same crystal structure as that of a target lithium titanate for production, preferably the lithium titanate compound is dry-mixed with the above two. Each of the materials (1) to (3) may be separately disintegrated or crushed prior to the mixing.

Mixing

When a titanium raw material for lithium titanate production of the present invention and a lithium compound are dry-mixed, it is believed that the titanium raw material of the present invention is easily dispersed in a dry-mixing device due to the high specific surface area, so as to be easily mixed with the lithium compound in a uniform state. The titanium raw material of the present invention is remarkably prevented from being attached to the inside of a mixing device (inner wall, piping, and the like) during mixing due to unknown cause, so that the variation of the component ratio in the precursor mixture is reduced. The productivity is thus improved, due to an improved yield rate and reduction in facility cleaning frequency.

A known mixing machine may be used for preparing the precursor mixture. For example, a dry-mixing machine such as a Henschel mixer, a V-shape mixer, a powder mixer, a double cone blender, and a tumbler mixer is preferably used. Mixing atmosphere is not specifically limited.

Crushing/Pressing After Mixing

The precursor mixture may be crushed after the mixing, may be placed under pressure after the mixing, or may be crushed and placed under pressure after the mixing. Since a material having a high specific surface area has a bulky volume (low bulk density) and occupies a large volume per unit mass in general, productivity such as the amount of throughput (material input amount) per unit time or per facility is reduced. Preferably, therefore, the precursor mixture is crushed or placed under pressure so as to have a proper bulk density. The crushing or the application of pressure allows a titanium raw material and a lithium compound to easily come into contact with each other, so that a preferable precursor mixture having high reactivity between the lithium compound and the titanium raw material can be easily produced.

Examples of crushing means include a known crusher such as a jet mill and cyclone mill.

Means for applying pressure (compression) and means for crushing under pressure (compression) can be used as the means for pressing. Examples of a known pressure forming machine and a known compacting machine which can be used include a roller compactor, a roller crusher, and pellet forming machine.

The precursor mixture preferably has a bulk density of 0.2 to 0.7 g/cm$^3$, more preferably 0.4 to 0.6 g/cm$^3$. A bulk density lower than the range reduces the contact between the titanium raw material and the lithium compound, resulting in reduced reactivity. A bulk density higher than the range allows gas generated in the reaction during the heating process to hardly escape or inhibits thermal conductivity, also resulting in reduced reactivity. Consequently, the single-phase rate of the produced lithium titanate is reduced in both cases. In the case of applying pressure to a precursor mixture, the precursor mixture having a bulk density in the range described above can be easily obtained under an applied pressure to powder of 0.6 t/cm$^2$ or less, more preferably less than 0.5 t/cm$^2$, further preferably in the range of 0.15 to 0.45 t/cm$^2$.

Mixed Crushing

In preparation of the precursor mixture, a mixed crushing machine may be used (the method may be hereinafter referred to as "mixed crushing"). In that case, a known crushing machine may be used. A dry-crushing machine such as a cyclone mill, a flake crusher, a hammer mill, a pin mill, a bantam mill, a jet mill, a cyclone mill, a Fret mill, a pan mill, an edge runner, a roller mill, a Mix-Muller, and a vibration mill is preferable, and a Fret mill, a pan mill, an edge runner, a roller mill, or a Mix-Muller is further preferable.

In mixed crushing, both of a titanium raw material and a lithium compound may be fed into a crushing machine. After initiation of crushing the one, the other may be then fed; or crushing may be initiated after feeding both. Alternatively, both may be mixed in a known mixer such as a Henschel mixer in advance, and then the mixture may be fed into a crushing machine so as to be crushed. The crushing under coexistence of the titanium raw material and the lithium compound allows the precursor mixture of the titanium raw material and the lithium compound which are sufficiently mixed to be easily obtained.

The crushing under coexistence of at least the lithium compound and the titanium raw material more easily increases the degree of mixture of the titanium raw material and the lithium compound compared with the mere mixing of fine particles in general, and preferably provides the precursor mixture of the lithium compound and the titanium raw material having a narrow particle size distribution with a uniform particle diameter more easily. The preferable precursor mixture having higher reactivity between the lithium compound and the titanium raw material is thus more easily obtained.

In the case of using an air flow crusher such as a jet mill and a cyclone mill for mixed crushing, a titanium raw material having a low bulk density, more specifically a bulk density in the range of 0.2 to 0.7 g/cm$^3$, produces a preferable lithium titanate precursor mixture having high reactivity. It is believed that the titanium raw material having a relatively low bulk density is easily dispersed in the air flow in the crusher so as to be uniformly mixed with a lithium compound. The range of the bulk density is more preferably 0.2 to 0.6 g/cm$^3$, further preferably 0.2 to 0.5 g/cm$^3$.

Mixed Crushing and Pressing

Concurrently with mixed crushing and/or after mixed crushing, the mixture may be placed under pressure. Since a crushed mixture has a bulky volume (low bulk density) and a large occupied volume per unit mass in general, productivity such as the amount of throughput (material input amount) per unit time or per facility is reduced. Preferably, therefore, the crushed mixture is placed under pressure so as to avoid getting bulky and to have a proper bulk density. The application of pressure further allows the titanium raw material and the lithium compound to easily come into contact with each other, so that a preferable precursor mixture having high reactivity between the lithium compound and the titanium raw material can be more easily produced. Means for applying pressure (compression) and means for crushing under pressure (compression) can be used as the means for applying pressure.

Pressure (compression) forming is preferable as means for applying pressure to the crushed mixture after mixed crushing, with use of the known pressure forming machine and the known compacting machine. The crushed mixture may be further pressure (compression) crushed as described below.

A pressure crushing machine and a compression crushing machine may be used as means for applying pressure concurrently with mixed crushing (pressure (compression) crushing). A crushing machine using pressure or compression may be appropriately used. At least one crushing machine selected from the group consisting of a Fret mill, a pan mill, an edge runner, a roller mill, and a Mix Muller may be used. The principle of crushing in a crushing machine is that high pressure applied to a specimen crushes the specimen. In the case of a Fret mill, the operating mechanism is described as follows. The rotation of a heavy roller grinds a specimen under the roller. A plurality of compounds is ground under the roller for a predetermined time period so as to be concurrently mixed. The use of a crushing machine of the type allows the mixed powder to be placed under pressure concurrently with crushing, so that the process can be simplified without necessity of separately having a compression process.

Preferably the lithium titanate precursor mixture has a bulk density in the range described above after mixed crushing, if needed, pressure is applied concurrently when mixed crushing or subsequently after mixed crushing. In the case of pressure is applied, preferably the applied pressure is in the range described above.

The frequency curve of the particle size distribution of the precursor mixture measured in a dispersed state in ethanol after mixed crushing preferably has only one peak. Preferably the volume average particle diameter is 0.5 μm or less and the D 90 (diameter at a cumulative frequency of 90%) is 10 μm or less, more preferably the volume average particle diameter is 0.45 μm or less and the D 90 (diameter at a cumulative frequency of 90%) is 6 μm or less.

The particle size distribution is controlled in the range described above, so that a sub-phase having a different composition is less formed, less unreacted raw materials remain, sintering proceeds less rapidly, and the specific surface area is less reduced. A target lithium titanate can be reliably and stably produced at a heating temperature lower than that in a conventional method.

In heating and reacting at least the aforementioned (1) titanium raw material for lithium titanate production, the (2) lithium compound, and the (3) lithium titanate compound having the same crystal structure as that of a target lithium titanate, if needed, the raw materials are placed in a heating furnace, so as to be raised to a predetermined temperature and held at the temperature for a predetermined time period for reaction. Examples of the heating furnace for use include a fluidized furnace, a stationary furnace, a rotary kiln, a tunnel kiln. The heating temperature is preferably 700° C. or higher and 950° C. or lower. In the case of $Li_4Ti_5O_{12}$, a temperature lower than 700° C. allows the single-phase rate of a target lithium titanate to be reduced, resulting in an increased amount of undesirable unreacted titanium raw materials. On the other hand, a temperature higher than 950° C. allows undesirable impurity phases ($Li_2TiO_3$ and $Li_2Ti_3O_7$) to be created. The preferable heating temperature in the range of 700° C. to 900° C. allows for a preferable range of the single-phase rate, which is described below, and stably produces the lithium titanate with suppressed sintering or grain growth. The heating time may be appropriately determined, in the suitable range of 3 to 6 hours. The heating atmosphere is not specifically limited. An oxidizing atmosphere such as air and oxygen gas, a non-oxidizing atmosphere such as nitrogen gas and argon gas, or a reducing atmosphere such as hydrogen gas and carbon monoxide gas can be used. In particular, an oxidizing atmosphere is preferable. Calcining may be performed, though not specifically required.

The lithium titanate thus produced may be disintegrated or crushed after cooling, if needed. The known crushing machine may be used for crushing. Sintering and grain growth are suppressed in the lithium titanate of the present invention, so that the lithium titanate particles are easily loosened by disintegration or crushing. Consequently, the lithium titanate particles are easily dispersed in a paste, suitable for manufacturing an electrode of an electric storage device.

The single-phase rate of lithium titanate is represented by the following expression 1, which is an index of the content rate of a target lithium titanate, preferably 90% or more, more preferably 93% or more, more preferably 95% or more, more preferably 96% or more, and further preferably 97% or more: (Expression 1) Single-phase rate (%)=100× (1−Σ ($Y_i$/X))

where X represents the main peak intensity of a target lithium titanate in a powder X-ray diffraction measurement using the Cu-Kα ray, $Y_i$ represents the main peak intensity of each sub-phase. In the case of $Li_4Ti_5O_{12}$, X is the peak intensity in the vicinity of 2θ=18°, while the peak intensity in the vicinity of 2θ=25° (anatase-type $TiO_2$), the peak intensity in the vicinity of 2θ=27° (rutile-type $TiO_2$), and the peak intensity in the vicinity of 2θ=44° ($Li_2TiO_3$) are used as $Y_i$, since anatase-type $TiO_2$, rutile-type $TiO_2$, and $Li_2TiO_3$ are likely to be present as sub-phases.

The produced lithium titanate has a large specific surface area of, preferably 1.0 m$^2$/g or more, more preferably 2.0 to 50.0 m$^2$/g, further preferably 2.0 to 40.0 m$^2$/g. The bulk density and the volume average particle diameter of lithium titanate may be appropriately set. The bulk density is preferably 0.1 to 0.8 g/cm$^3$, more preferably 0.2 to 0.7 g/cm$^3$. The volume average particle diameter is preferably 1 to 10

μm. The content of impurities is preferably low, more specifically in the following specific range: sodium (1000 ppm or less), potassium (500 ppm or less), silicon (1000 ppm or less), calcium (1000 ppm or less), iron (500 ppm or less), chromium (500 ppm or less), nickel (500 ppm or less), manganese (500 ppm or less), copper (500 ppm or less), zinc (500 ppm or less), aluminum (500 ppm or less), magnesium (500 ppm or less), niobium (0.3% or less by weight), zirconium (0.2% or less by weight), $SO_4$ (1.0% or less by weight), and chlorine (1.0% or less by weight).

The present invention also relates to an electrode active material which includes the lithium titanate of the present invention. The present invention also relates to an electric storage device including the use of lithium titanate produced by the production method of the present invention. The electric storage device includes an electrode, a counter electrode, a separator, and an electrolyte. The electrode is produced by adding a conductive material and a binder to the electrode active material so as to be appropriately formed or coated. Examples of the conductive material include a conductive aid such as carbon black, acetylene black, and ketjen black. Examples of the binder include a fluorine resin such as polytetrafluoroethylene, polyvinylidene fluoride, and fluororubber, and a water-soluble resin such as styrene-butadiene rubber, carboxymethylcellulose, and polyacrylic acid. In the case of a lithium battery, the electrode active material is used for the positive electrode and metal lithium, lithium alloy, or a carbon-containing material such as graphite may be used for the counter electrode. Alternatively, the electrode active material may be used for the negative electrode, and a lithium-transition metal composite oxide such as a lithium-manganese composite oxide, a lithium-cobalt composite oxide, a lithium-nickel composite oxide, a lithium-cobalt-manganese-nickel composite oxide, and a lithium-vanadium composite oxide, and an olivine-type compound such as a lithium-iron phosphate composite compound may be used for the positive electrode. A porous polypropylene film or the like is used for any devices. A commonly used material such as a lithium salt such as $LiPF_6$, $LiClO_4$, $LiCF_3SO_3$, $LiN(CF_3SO_2)_2$, and $LiBF_4$ dissolved in a solvent such as propylene carbonate, ethylene carbonate, dimethyl carbonate, diethyl carbonate, ethylmethyl carbonate, γ-butyl lactone, and 1,2-dimethoxy ethane may be used as the electrolyte. The lithium titanate of the present invention may be used not only as an active material of a lithium secondary battery but also for attaching to the surface of an active material of another type, for compounding in an electrode, for being contained in a separator, or as a lithium ion conductor. Alternatively, the lithium titanate may be used as an active material of a sodium ion battery.

EXAMPLES

Examples of the present invention are described in the following. The present invention is, however, not limited to the examples.

EXAMPLES

Each of the powder described in Table 1 was prepared as a titanium raw material. It was confirmed that each was formed of anatase-type titanium dioxide.

TABLE 1

| Titanium raw material | Specific surface area ($m^2/g$) | Bulk density ($g/cm^3$) | $SO_4$ (% by weight) |
| --- | --- | --- | --- |
| a | 270 | 0.30 | 0.55 |
| b | 160 | Unmeasured | 0.56 |
| c | 100 | 0.24 | 0.29 |
| d | 97 | 0.24 | 0.47 |
| e | 93 | 0.30 | 0.46 |
| f | 62 | 0.35 | 0.46 |
| g | 27 | Unmeasured | 0.11 |
| h | 12 | 0.39 | 0.02 |

Example 1

A titanium raw material a and a lithium compound of lithium carbonate powder (purity: 99.2%, volume average particle diameter: 7.5 μm, specific surface area: 1.25 $m^2/g$) were sampled to obtain a Li/Ti molar ratio of 0.81. The raw materials were mixed in a Henschel mixer for 20 minutes at 1800 rpm so that a precursor mixture was prepared. Subsequently the precursor mixture was heated at 750° C. in the atmosphere for 3 hours, using an electric furnace, so that lithium titanate was synthesized. The produced lithium titanate was disintegrated with a sample mill, so that Sample 1 was obtained.

Example 2

Lithium titanate of Sample 2 was obtained in the same manner as in Example 1 except for the use of a titanium raw material b instead of the titanium raw material a.

Example 3

Lithium titanate of Sample 3 was obtained in the same manner as in Example 1 except for the use of a titanium raw material c instead of the titanium raw material a.

Example 4

Lithium titanate of Sample 4 was obtained in the same manner as in Example 1 except for the use of a titanium raw material d instead of the titanium raw material a, and except that the heating temperature was 800° C.

Example 5

Lithium carbonate powder (purity: 99.2%, volume average particle diameter: 7.5 μm, specific surface area: 1.25 $m^2/g$) was processed into lithium carbonate powder having a volume average particle diameter of 3.7 μm, using a jet mill (STJ-200 made by Seishin Enterprise Co., Ltd). A titanium raw material e and a lithium compound of the crushed lithium carbonate powder were sampled to obtain a Li/Ti molar ratio of 0.81, and the raw materials were mixed in a Henschel mixer for 10 minutes at 1800 rpm so that a precursor mixture was prepared. Subsequently the precursor mixture was heated at 750° C. in the atmosphere for 3 hours, using an electric furnace, so that lithium titanate was synthesized. The produced lithium titanate was disintegrated with a jet mill, so that Sample 5 was obtained.

Example 6

Sample 6 was obtained in the same manner as in Example 5 except for the use of lithium carbonate without crushing.

Example 7

Sample 7 was obtained in the same manner as in Example 6 except that the heating was performed at a temperature of 800° C. in the atmosphere for 3 hours.

Example 8

Sample 8 was obtained in the same manner as in Example 5 except for the use of lithium carbonate which was crushed to have a volume average particle diameter of 2.1 μm as the lithium compound.

Example 9

Sample 9 was obtained in the same manner as in Example 5 except for the use of lithium carbonate which was crushed to have a volume average particle diameter of 5.0 μm as the lithium compound.

Example 10

A titanium raw material e and lithium carbonate powder (purity: 99.2%, volume average particle diameter: 7.5 μm, specific surface area: 1.25 m$^2$/g) were sampled to obtain a Li/Ti molar ratio of 0.81. Further, 5 weight parts of lithium titanate ($Li_4Ti_5O_{12}$, purity: 99%, average particle diameter of primary particles: 1 μm) as a lithium titanate compound having the same crystal structure as that of a target lithium titanate was added to 100 weight parts of raw materials so as to be mixed/crushed/compressed with a Fret mill (crushing roller: 40 kg, rotating speed: 50 rpm) for 15 minutes. A lithium titanate precursor was thus manufactured. The precursor had a bulk density of 0.6 g/cm$^3$, a volume average particle diameter of 0.4 μm, and a D 90 of 6.2 μm. The frequency curve of the particle size distribution has only one peak. Subsequently the lithium titanate precursor was heated at 750° C. in the atmosphere for 3 hours, using an electric furnace, so that lithium titanate was synthesized. The produced lithium titanate was disintegrated with a jet mill, so that Sample 10 was obtained. The obtained Sample 10 had a bulk density of 0.6 g/cm$^3$ and a specific surface area of 5 m$^2$/g.

Example 11

Sample 11 was obtained in the same manner as in Example 10 except that the titanium raw material, the lithium carbonate powder, and the lithium titanate as the lithium titanate compound having the same crystal structure as that of the target lithium titanate were mixed in a Henschel mixer for 5 minutes at 1020 rpm, and the mixture was then crushed with a jet mill (STJ-200 made by Seishin Enterprise Co., Ltd.) and subsequently placed under pressure (compression pressure: 0.4 ton/cm$^2$) with a roller compactor (WP160×60 made by Freund-Turbo Corporation) for manufacturing of a lithium titanate precursor.

The lithium titanate precursor had a bulk density of 0.7 g/cm$^2$, a volume average particle diameter of 0.4 μm, and a D 90 of 2.2 μm. The frequency curve of the particle size distribution has only one peak. Sample 11 had a bulk density of 0.6 g/cm$^3$.

Example 12

Sample 12 was obtained in the same manner as in Example 10 except that the titanium raw material, the lithium carbonate powder, and the lithium titanate as the lithium titanate compound having the same crystal structure as that of the target lithium titanate were mixed in a Henschel mixer for 5 minutes at 1020 rpm, and the mixture was then crushed with a jet mill (STJ-200 made by Seishin Enterprise Co., Ltd.) for manufacturing of a lithium titanate precursor.

The lithium titanate precursor had a bulk density of 0.3 g/cm$^2$, a volume average particle diameter of 0.4 μm, and a D 90 of 2.2 μm. The frequency curve of the particle size distribution has only one peak. Sample 12 had a bulk density of 0.3 g/cm$^3$.

Example 13

Sample 13 was obtained in the same manner as in Example 10 except that the titanium raw material, the lithium carbonate powder, and the lithium titanate as the lithium titanate compound having the same crystal structure as that of the target lithium titanate were mixed in a Henschel mixer for 10 minutes at 1800 rpm for manufacturing of a lithium titanate precursor.

The lithium titanate precursor had a bulk density of 0.3 g/cm$^3$, a volume average particle diameter of 0.9 μm, and a D 90 of 15.2 μm. The frequency curve of the particle size distribution has two peaks. Sample 13 had a bulk density of 0.3 g/cm$^3$.

Example 14

Sample 14 of lithium titanate was synthesized in the same manner as in Example 13 except that the lithium titanate precursor was further placed under pressure (compression pressure: 0.4 ton/cm$^2$) with a roller compactor for manufacturing of a lithium titanate precursor and the heating temperature was 750° C. The precursor had a bulk density of 0.6 g/cm$^3$. Sample 14 had a bulk density of 0.6 g/cm$^3$.

Example 15

Lithium titanate of Sample 15 was obtained in the same manner as in Example 4 except for the use of a titanium raw material f instead of the titanium raw material d.

Comparative Example 1

Lithium titanate of Sample 16 was obtained in the same manner as in Example 4 except for the use of a titanium raw material g instead of the titanium raw material d.

Comparative Example 2

Lithium titanate of Sample 17 was obtained in the same manner as in Example 1 except for the use of a titanium raw material h instead of the titanium raw material a and except that the heating temperature was 900° C.

(Evaluation 1)

The powder X-ray diffraction pattern of each of the obtained Samples 1 to 17 was observed with a powder X-ray diffractometer (Ultima IV made by Rigaku Corporation, with Cu-Kα ray). It is confirmed that the main component of each sample was $Li_4Ti_5O_{12}$. Among the measured peak intensities, the peak intensity of $Li_4Ti_5O_{12}$ in the vicinity of 2θ=18° was used as X, and the peak intensity of rutile-type $TiO_2$ in the vicinity of 2θ=27°, the peak intensity of anatase-type $TiO_2$ in the vicinity of 2θ=25°, and the peak intensity of $Li_2TiO_3$ in the vicinity of $2\theta=44°$ were used as Y, so as to calculate the single-phase rate. The results are described in Table 2.

TABLE 2

| | Titanium raw material | Specific surface area (m²/g) | Heating temperature (° C.) | Lithium titanate | Single-phase rate (%) |
|---|---|---|---|---|---|
| Example 1 | a | 270 | 750 | Sample 1 | 99 |
| Example 2 | b | 160 | 750 | Sample 2 | 98 |
| Example 3 | c | 100 | 750 | Sample 3 | 97 |
| Example 4 | d | 97 | 800 | Sample 4 | 98 |
| Example 5 | e | 93 | 750 | Sample 5 | 98 |
| Example 6 | e | 93 | 750 | Sample 6 | 93 |
| Example 7 | e | 93 | 800 | Sample 7 | 99 |
| Example 8 | e | 93 | 750 | Sample 8 | 98 |
| Example 9 | e | 93 | 750 | Sample 9 | 98 |
| Example 10 | e | 93 | 750 | Sample 10 | 96 |
| Example 11 | e | 93 | 750 | Sample 11 | 98 |
| Example 12 | e | 93 | 750 | Sample 12 | 96 |
| Example 13 | e | 93 | 750 | Sample 13 | 93 |
| Example 14 | e | 93 | 750 | Sample 14 | 90 |
| Example 15 | f | 62 | 800 | Sample 15 | 98 |
| Comparative example 1 | g | 27 | 800 | Sample 16 | 95 |
| Comparative example 2 | h | 12 | 900 | Sample 17 | 94 |

It was found that the use of a titanium raw material including an oxide of titanium having a specific surface area of 50 to 450 m²/g allows lithium titanate having a high single-phase rate to be produced even under conditions with a low heating temperature of 750° C. or 800° C. In contrast, it was found that the use of a titanium raw material having a specific surface area less than 50 m²/g needed higher heating temperature for an increased single-phase rate. More specifically, the use of a titanium raw material having a specific surface area of 12 m²/g resulted in a low single-phase rate of 94% even with an extremely high heating temperature of 900° C. (Sample 17), and caused advanced sintering between lithium titanate particles, and difficulty in disintegration. The use of a titanium raw material having a specific surface area of 27 m²/g also resulted in a low single-phase rate of 95% even with a heating temperature of 800° C. (Sample 16).

(Evaluation 3)

The specific surface area of each of Sample 5 and Sample 6 was measured by single-point BET method (nitrogen adsorption, Monosorb made by Yuasa-Ionics Co., Ltd). As a result, the samples had a specific surface area of 4.9 m²/g and 3.0 m²/g, respectively. This showed that the production method of the present invention prevents lithium titanate particles from sintering with each other and allows for synthesis of lithium titanate which is easily crushed to achieve suppressed reduction in specific surface area.

(Evaluation 4)

Evaluation of Battery Characteristics (1) Manufacturing of Electric Storage Device Lithium titanate of Sample 5, acetylene black powder as a conductive material, and a polyvinylidene fluoride resin as a binder were mixed at a weight ratio of 100:5:7, and kneaded into a paste in a mortar. The paste was applied to an aluminum foil, dried at a temperature of 120° C. for 10 minutes, and then punched out into a circular form with a diameter of 12 mm, which was pressed at 17 MPa to form a working electrode. The weight of the active material contained in the electrode was 3 mg.

The working electrode was vacuum-dried at 120° C. for 4 hours, and then installed as a positive electrode into a closable coin-type battery in a glove box with a dew point of −70° C. or lower. The coin-type battery was formed of stainless steel (SUS 316) with an outer diameter of 20 mm and a height of 3.2 mm. The negative electrode was formed of metal lithium in a circular shape with a thickness of 0.5 mm and a diameter of 12 mm. $LiPF_6$ was dissolved in a mixed solution of ethylene carbonate and dimethyl carbonate (at mixing volume ratio of 1:2) at a concentration of 1 mole/litter so as to form a nonaqueous electrolyte.

The working electrode was placed on the lower can of the coin-type battery. A porous polypropylene film was placed thereon as a separator, and the nonaqueous electrolyte was dropped thereon. The negative electrode and a spacer with a thickness of 0.5 mm and a spring (both made of SUS 316) for thickness adjustment were placed further thereon. An upper can having a gasket made of polypropylene was placed as a cover, of which outer periphery was clinched for sealing. An electric storage device (Sample A) of the present invention was thus obtained.

An electric storage device (Sample B) was obtained in the same method as for Sample A of an electric storage device except for the use of Sample 6 as the lithium titanate.

(2) Evaluation of Rate Characteristics

Figure 1:
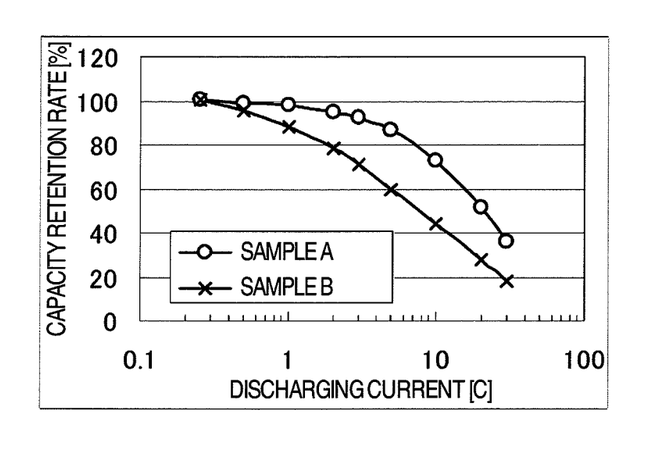
FIG. 1 is a graph illustrating the rate characteristics of Samples A and B of an electric storage device.

The discharged capacity of the produced electric storage devices (Samples A and B) was measured for various current amounts so as to calculate a capacity retention rate (%). The voltage range was set to 1 to 3 V, the charging current was set to 0.25 C, the discharging current was set to the range of 0.25 C to 30 C for the measurement. The ambient temperature was set to 25° C. The capacity retention rate was calculated from an equation: $(X_n/X_{0.25}) \times 100$, where $X_{0.25}$ represents the measured discharged capacity at 0.25 C, and $X_n$ represents the measured value in the range of 0.5 C to 30 C. The term 1 C here means the current value for full charging in one hour. In the present evaluation, 0.48 mA is equivalent to 1 C. The higher the capacity retention rate is, the better the rate characteristics is. The results are described in FIG. 1. It was found that both of the electric storage devices (Samples A and B) had excellent rate characteristics, and Sample A was more excellent.

INDUSTRIAL APPLICABILITY

According to the method for producing lithium titanate of the present invention, a target lithium titanate can be reliably and stably produced at a heating temperature lower than that in a conventional method at a low cost.

The use of the lithium titanate produced by the method as an electrode active material allows for production of an electric storage device excellent in battery characteristics, in particular, rate characteristics.

The invention claimed is:

1. A method for producing lithium titanate $Li_4Ti_5O_{12}$ comprising heating materials consisting essentially of the following three materials:
   (1) a titanium raw material for producing lithium titanate $Li_4Ti_5O_{12}$ wherein the titanium raw material comprises an oxide of titanium having a specific surface area of 50 to 450 m²/g measured by single-point BET nitrogen adsorption, wherein the oxide of titanium has a bulk density of 0.2 to 0.7 g/cm³;
   (2) a lithium hydroxide or a lithium carbonate; and
   (3) a lithium titanate compound $Li_4Ti_5O_{12}$ having the same crystal structure as that of a target lithium titanate, wherein at least the (1) titanium raw material, the (2)

lithium compound, and the (3) lithium titanate compound having the same crystal structure as that of the target lithium titanate are dry-mixed prior to heating.

2. The method for producing lithium titanate according to claim 1, wherein a sulfur content of the oxide of titanium is 1.0 wt. % or less calculated in terms of $SO_4$.

3. The method for producing lithium titanate according to claim 1, wherein the dry-mixing is carried out by crusher.

* * * * *